UNITED STATES PATENT OFFICE.

WALLACE LORD, OF PONTIAC, ILLINOIS.

ARTIFICIAL STONE.

SPECIFICATION forming part of Letters Patent No. 392,160, dated October 30, 1888

Application filed April 13, 1888. Serial No. 270,574. (No specimens.)

*To all whom it may concern:*

Be it known that I, WALLACE LORD, a citizen of the United States, residing at Pontiac, in the county of Livingston and State of Illinois, have invented certain new and useful Improvements in Artificial Stone; and I do hereby declare the following to be a full, clear, and exact description of the invention, such as will enable others skilled in the art to which it appertains to make and use the same.

My invention consists in a composition for the manufacture of artificial stone, the constituents of which are mixed and combined in the manner hereinafter fully set forth.

In the manufacture of artificial stone I first prepare a solution composed of three pounds silicate of soda, three pounds sal-ammoniac, two pounds sulphate of iron, and two pounds of lime. These ingredients are dissolved in thirty gallons of water and mixed thoroughly together, and the resulting solution forms the main feature of my invention.

To make my artificial stone, I combine from three to six parts of sand with one part of cement or plaster-of-paris and dampen them with my solution above described, so as to make a mass suitable for molding. This composition will harden very readily and will resist the action of the weather. If a harder or softer stone is required, the proportions of the sand and cement may be varied and the result easily accomplished, the solution remaining the same, the larger proportion of sand producing a softer stone and the smaller proportion of sand producing a harder stone.

I am aware that some of the ingredients herein named have been used heretofore for the manufacture of artificial stone; but I am not aware that all of the ingredients employed by me have ever before been used for that purpose.

I may also use coloring-matter in the manufacture of my artificial stone, by which means beautiful imitations of marble and other grained stones are produced, the cement being colored to produce the desired result.

As my artificial stone is not affected by heat or frost or by the action of water, it is especially adapted for building purposes and for other uses where a hard, strong, and durable stone is desired.

What I claim, and desire to secure by Letters Patent, is—

1. In a composition for the manufacture of artificial stone, the combination, with sand and cement, of a moistening solution consisting of silicate of soda, sal-ammoniac, sulphate of iron, and lime, substantially as specified.

2. In a composition for the manufacture of artificial stone, a moistening solution consisting of silicate of soda, sal-ammoniac, sulphate of iron, and lime, substantially as specified.

In testimony whereof I affix my signature in presence of two witnesses

WALLACE LORD.

Witnesses:
JOHN T. WILSON,
J. D. A. FRALEY.